(12) United States Patent
Verdier

(10) Patent No.: US 8,161,378 B2
(45) Date of Patent: Apr. 17, 2012

(54) WORD PROCESSING STYLE SELECTOR SYSTEM USING 2D MATRIX

(76) Inventor: Lesly Verdier, Amstelveen (NL)

( * ) Notice: Subject to any disclaimer, the term of this patent is extended or adjusted under 35 U.S.C. 154(b) by 399 days.

(21) Appl. No.: 12/540,702

(22) Filed: Aug. 13, 2009

(65) Prior Publication Data

US 2011/0041049 A1 Feb. 17, 2011

(51) Int. Cl.
*G06F 17/00* (2006.01)
(52) U.S. Cl. ........................................... 715/244
(58) Field of Classification Search .............. 715/243, 715/244, 253, 273, 227, 847
See application file for complete search history.

(56) References Cited

U.S. PATENT DOCUMENTS

| | | | | |
|---|---|---|---|---|
| 5,231,577 A * | 7/1993 | Koss | ............................ | 715/210 |
| 5,414,809 A * | 5/1995 | Hogan et al. | .................. | 715/765 |
| 5,621,876 A * | 4/1997 | Odam et al. | .................. | 715/212 |
| 5,790,093 A * | 8/1998 | Takahashi | ..................... | 345/472 |
| 5,860,073 A * | 1/1999 | Ferrel et al. | ................... | 715/255 |
| 6,195,665 B1 * | 2/2001 | Jarett | ............................ | 715/251 |
| 6,952,819 B1 * | 10/2005 | Wada et al. | ................... | 717/123 |
| 6,990,480 B1 * | 1/2006 | Burt | ...................... | 1/1 |
| 2002/0120596 A1 * | 8/2002 | Gershoff et al. | ................. | 707/1 |
| 2002/0138582 A1 * | 9/2002 | Chandra et al. | ............. | 709/206 |
| 2005/0120297 A1 * | 6/2005 | Taboada et al. | ............. | 715/510 |
| 2006/0161841 A1 * | 7/2006 | Horiuchi et al. | ............. | 715/513 |
| 2006/0259853 A1 * | 11/2006 | Zellweger et al. | ......... | 715/500.1 |
| 2007/0061714 A1 * | 3/2007 | Stuple et al. | ................. | 715/529 |
| 2007/0100967 A1 * | 5/2007 | Smith et al. | ................... | 709/219 |
| 2007/0124364 A1 * | 5/2007 | Hackworth et al. | .......... | 709/203 |
| 2007/0128899 A1 * | 6/2007 | Mayer | ........................... | 439/152 |
| 2007/0220424 A1 | 9/2007 | Shaw et al. | | |
| 2008/0115049 A1 | 5/2008 | Tolle et al. | | |
| 2008/0195379 A1 * | 8/2008 | Vanderwold et al. | ............. | 704/9 |
| 2009/0320073 A1 * | 12/2009 | Reisman | ........................ | 725/51 |

FOREIGN PATENT DOCUMENTS

| | | |
|---|---|---|
| EP | 1672518 | 6/2006 |
| WO | 2007030729 | 3/2007 |
| WO | 2008110980 | 9/2008 |

OTHER PUBLICATIONS

Dutch Search Report, related to corresponding Dutch Patent Application No. 2003548, mailed Sep. 20, 2010.
XP002598677: online pages Wikipedia, found on the Internet on Aug. 27, 2010.
XP002599217: online pages Keyboard Shortcuts, found on the Internet on Aug. 27, 2010.

\* cited by examiner

*Primary Examiner* — Laurie Ries

(57) ABSTRACT

The invention relates to a computer system operable to apply a selected editing style to selected paragraphs of a computer-readable document. The system includes a processor configured for generating a 2D matrix of editing styles available for the document, assigning a first shortcut key to a first procedure for selecting an editing style from the 2D matrix, processing a first user input including data indicative of the editing style selected using the first shortcut key, and, based on the first user input, applying the selected editing style to the selected paragraphs to generate modified paragraphs. The system also includes a memory configured for storing the 2D matrix and a display configured for displaying the modified paragraphs. Such a system may provide a quick visualization of a large number of styles, where the user does not have to memorize much information about choosing a particular style.

22 Claims, 4 Drawing Sheets

| | 301 | 302 | 303 | 304 | 305 | 306 | 307 | 308 | 309 |
|---|---|---|---|---|---|---|---|---|---|
| 311→ | Heading 1 | Heading 2 | Heading 3 | Heading 4 | Heading 5 | Heading 6 | Heading 7 | Heading 8 | Heading 9 |
| 312→ | Body Text1 | Body Text2 | Body Text3 | Body Text4 | Body Text5 | Body Text6 | Body Text7 | Body Text8 | Body Text9 |
| 313→ | Enum 1 | Enum 2 | Enum 3 | Enum 4 | Enum 5 | Enum 6 | Enum 7 | Enum 8 | Enum 9 |
| 314→ | ELA 1 | ELA 2 | ELA 3 | ELA 4 | ELA 5 | ELA 6 | ELA 7 | ELA 8 | ELA 9 |
| 315→ | EUA 1 | EUA 2 | EUA 3 | EUA 4 | EUA 5 | EUA 6 | EUA 7 | EUA 8 | EUA 9 |
| 316→ | ELR 1 | ELR 2 | ELR 3 | ELR 4 | ELR 5 | ELR 6 | ELR 7 | ELR 8 | ELR 9 |
| 317→ | EUR 1 | EUR 2 | EUR 3 | EUR 4 | EUR 5 | EUR 6 | EUR 7 | EUR 8 | EUR 9 |
| 318→ | BulletDot1 | BulletDot2 | BulletDot3 | BulletDot4 | BulletDot5 | BulletDot6 | BulletDot7 | BulletDot8 | BulletDot9 |
| 319→ | Etc 1 | Etc 2 | Etc 3 | Etc 4 | Etc 5 | Etc 6 | Etc 7 | Etc 8 | Etc 9 |

300

WORD PROCESSING STYLE SELECTOR SYSTEM USING 2D MATRIX

BACKGROUND OF THE INVENTION

1. Field of the Invention

Embodiments of the present invention relate generally to the field of computer systems and, more specifically, to systems and methods for applying a selected editing style to selected paragraphs of a computer-readable document.

2. Description of the Related Art

The era of modern communications has produced a need to create and maintain large computer-readable text documents (e.g. Microsoft Word documents of 200 pages and more). One problem with such documents is that they may become corrupted, where part of the data contained in the document is lost and cannot be recovered.

One way to reduce the chance of large documents becoming corrupted is to use styles when creating a document with some word processing tool, such as e.g. Heading 1, Heading 2, Default, Body Text, etc. Using styles also simplifies the repair of a corrupted document.

Currently, there are several different approaches for creating styles in a computer-readable document. One approach is to manually choose a style among the plurality of styles available for the document. However, many users find this approach boring and tedious. Another approach is to use shortcut keys where each shortcut key corresponds to a particular style. However, there is only a limited number of shortcut keys, which limits the number of styles that may be used in this manner. In addition, remembering which shortcut key corresponds to which style may be difficult. Another approach is to use a tool bar that displays to the user the available styles. However, to have a large collection of styles at the user's disposal, a large tool bar is needed, taking up much space on the display. Yet another approach is to use a conventional menu bar. However, using the menu bar may be quite time-consuming because often times several clicks of a computer mouse are required to get to the desired style.

As the foregoing illustrates, what is needed in the art is a system and a method for applying styles that overcomes one or more problems described above.

SUMMARY OF THE INVENTION

One embodiment of the present invention sets forth a computer system operable to apply a selected editing style to one or more selected paragraphs of a computer-readable document. The system includes a processor configured for generating a two-dimensional (2D) matrix of editing styles available for the document and assigning a first shortcut key to a first procedure for selecting an editing style from the 2D matrix. The processor is further configured for receiving and processing a first user input including data indicative of the editing style selected using the first shortcut key and, based on the first user input, applying the selected editing style to the one or more selected paragraphs to generate one or more modified paragraphs. The system also includes a memory and a display connected to the processor. The memory is configured for storing the 2D matrix and the display is configured for displaying the one or more modified paragraphs.

One advantage of the present invention is that by creating a 2D matrix of available styles, assigning a shortcut key to a procedure for selecting a style, and, immediately after a user selected a style, displaying the part of the document with the selected style applied, the user may quickly get an impression of a large number of styles without having to memorize much information about choosing a particular style.

Hereinafter, an embodiment of the invention will be described in further detail. It should be appreciated, however, that this embodiment may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
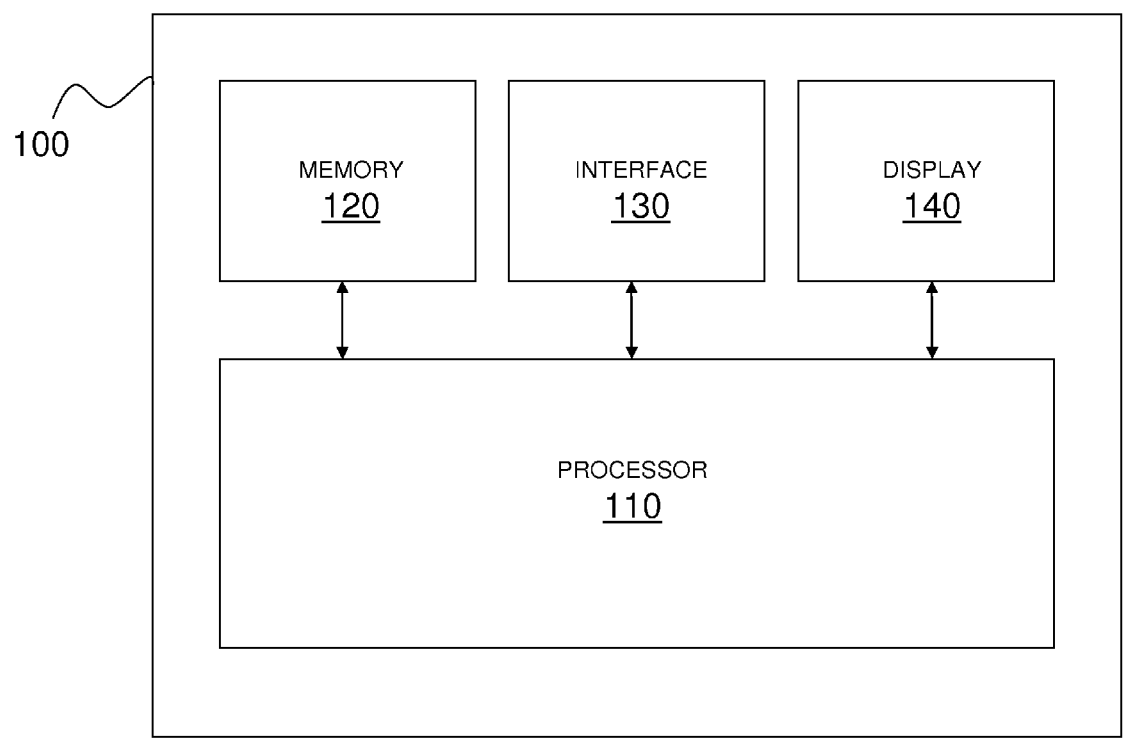
FIG. 1 is a schematic illustration of a computer system operable to implement one or more aspects of the present invention.

FIG. 1 is a schematic illustration of a computer system 100 operable to implement one or more aspects of the present invention. As shown, the system 100 includes a processor 110. The system 100 also includes a memory 120, an interface 130, and a display 140, connected to the processor 110. The interface 130 is configured to receive user input from one or more user input devices (e.g., keyboard, mouse, not shown in FIG. 1) and forward the user input to processor 110. The processor 110 is configured to perform some of the steps for applying a selected editing style in a computer-readable document, as described below. The memory 120 may be operable to store instructions that, when executed by the processor 110, perform any of the methods described herein. The display 140 is configured to display the results of the method steps performed by the processor 110.

Connections between different components in FIG. 1 may use different protocols as is known in the art. It will be appreciated that the system shown herein is illustrative and that variations and modifications are possible.

Figure 2:
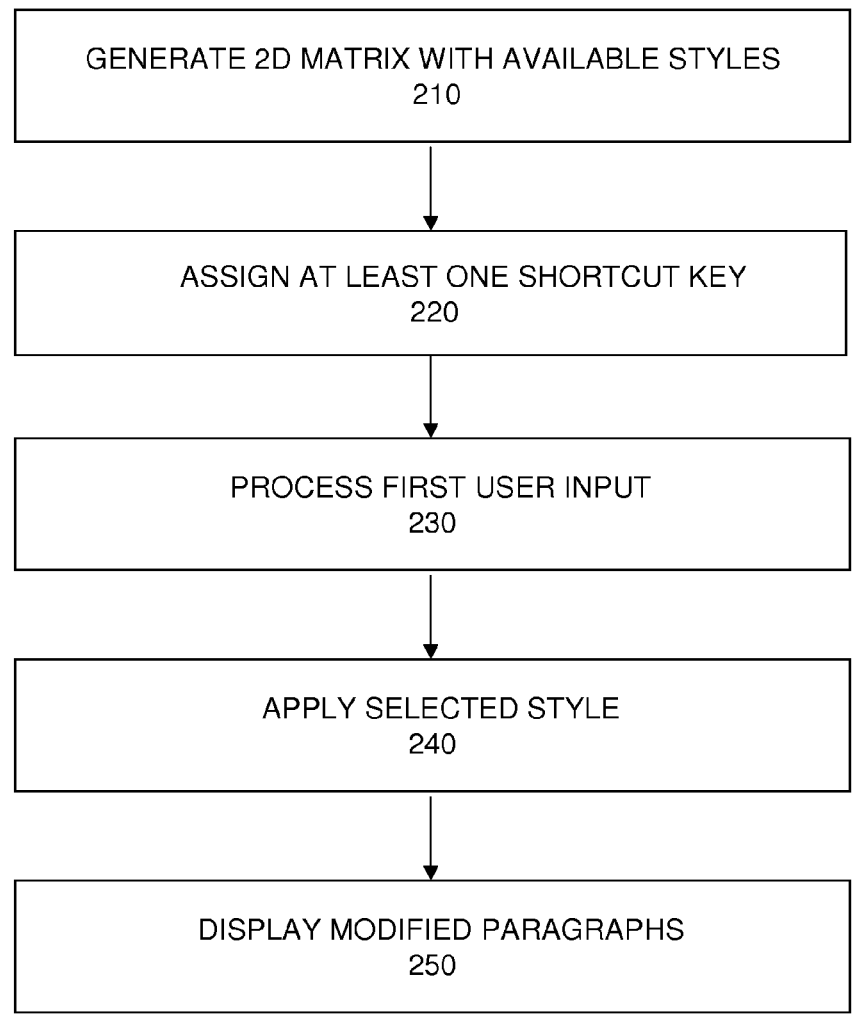
FIG. 2 is a flow diagram of method steps for applying a selected editing style to selected paragraphs of a computer-readable document, according to one embodiment of the present invention.

FIG. 2 is a flow diagram of method steps for applying a selected editing style to selected paragraphs of a computer-readable document, according to one embodiment of the present invention. While the method steps are described in conjunction with FIG. 1, persons skilled in the art will recognize that any system configured to perform the method steps, in any order, is within the scope of the present invention. Furthermore, while the word processing tool used to create the computer-readable document is described to be Microsoft Word, persons skilled in the art will recognize that embodiments of the present invention may be implemented in association with other word processing tools as well.

Figure 3:
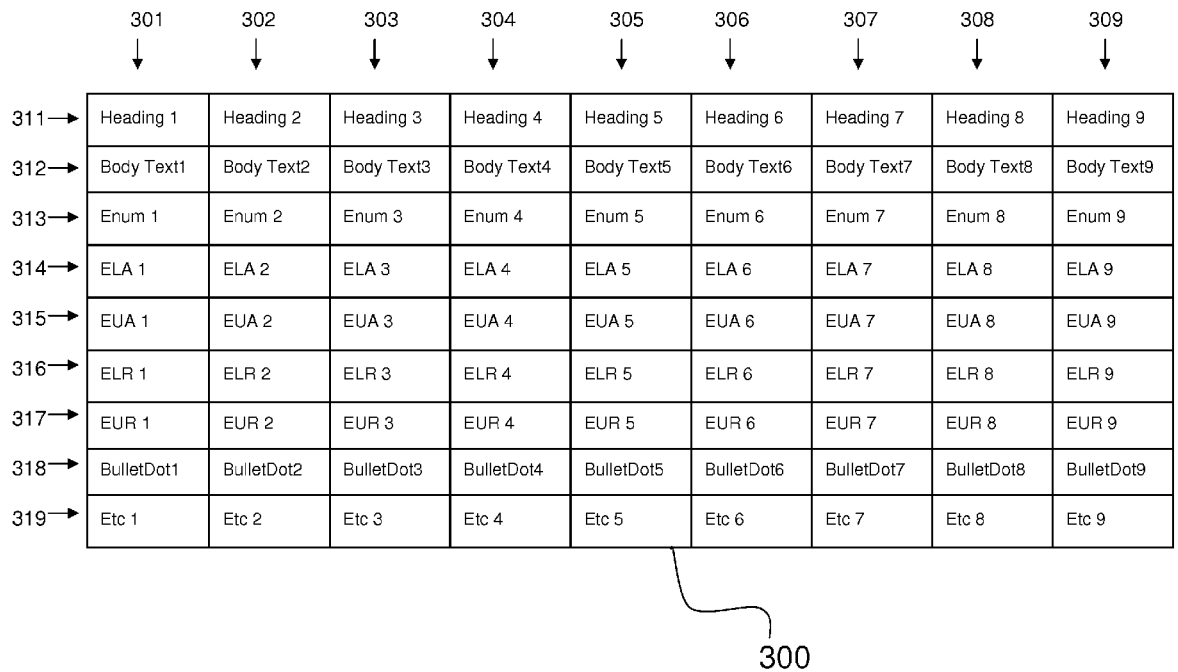
FIG. 3 is a schematic illustration of a 2D matrix, according to one embodiment of the present invention.

The method begins in step 210 where the processor 110 generates a 2D matrix of editing styles available for a Microsoft Word document. FIG. 3 illustrates a 2D matrix 300, according to one embodiment of the present invention. As shown in FIG. 3, the 2D matrix 300 includes cells arranged in columns 301-309 and rows 311-319. Each of the cells contains one of the styles available for the document. In this embodiment, the available styles include heading styles (shown in FIG. 3 as Heading 1-Heading 9), body text styles (shown in FIG. 3 as Body Text 1-Body Text 9), enumeration styles (i.e., numbering with digits 1, 2, 3, etc., shown in FIG. 3 as Enum 1-Enum 9), enumeration lower alpha (i.e., numbering with lower case letters a, b, c, etc., shown in FIG. 3 as ELA 1-ELA 9), enumeration upper alpha (i.e., numbering with upper case letters A, B, C, etc., shown in FIG. 3 as EUA 1-EUA 9), enumeration lower roman (i.e., numbering with lower case romans i, ii, iii, etc., shown in FIG. 3 as ELR 1-ELR 9), enumeration upper roman (i.e., numbering with upper case romans I, II, III, etc., shown in FIG. 3 as EUR 1-EUR 9), enumeration with bullets (shown in FIG. 3 as BulletDot 1-BulletDot 9), as well as other styles, shown in FIG. 3 as Etc 1-Etc 9. The 2D matrix 300 may be stored in the memory 120.

The method then proceeds to step 220, where the processor 110 assigns a shortcut key to a procedure for selecting a style from the 2D matrix 300. The procedure for selecting a style may include the steps of determining a current style applied to one or more selected paragraphs, determining a location of the current style within the two-dimensional matrix, and selecting a style located a certain number of cells away in a certain direction from the current style as the editing style. As used herein, the term "location" of a style refers to the cell of the 2D matrix containing the style that may be identified by a row number and a column number of the cell. For example, with the reference to FIG. 3, the location of the style Heading 1 refers to the cell that is in column 301, row 311 of the 2D matrix 300.

In various embodiments, the processor 110 may assign several shortcut keys to different procedures for selecting a style: one shortcut key corresponding to one procedure. For example, a combination of an "Alt" key and an arrow key ("Down," "Up," "Left" or "Right") may be of a particular interest because this combination is currently not used by Microsoft Word as a default shortcut key. Furthermore, four shortcut keys that may be created with such a combination ("Alt-Down," "Alt-Up," "Alt-Left," and "Alt-Right") may be conveniently used to go through the available styles of the 2D matrix 300 in a manner that is intuitive to the user. In this manner, the direction of an arrow may indicate the direction from the current style for selecting the editing style.

Consider, for example, that the current style applied to a selected paragraph is Body Text 4. The key "Alt-Down" could then be assigned to the procedure of selecting the style contained in the cell that is directly below the cell containing the current style. According to the 2D matrix 300, in this case, the selected style would be Enum 4. Similarly, each of the keys "Alt-Up," "Alt-Left," and "Alt-Right" could be assigned to the procedures of selecting the style contained in the cell that is directly above, left, and right from the cell containing the current style, respectively.

In step 230, the processor 110 receives and processes a first user input including data indicative of the editing style selected using the shortcut key. The first user input may be provided to the processor from a keyboard via the interface 130. The method then proceeds to step 240, where, based on the first user input, the processor 110 applies the selected editing style to the selected paragraphs. As a result of step 240, modified paragraphs are generated. The method ends in step 250, where the display 140 displays the modified paragraphs.

Steps 230 through 250 may be repeated until the user finds the style that he or she likes. For example, continuing with the 2D matrix 300 illustrated in FIG. 3, if the current style is Body Text 4 and, after pressing "Alt-Left," the user does not like the displayed modified paragraph having Body Text 3, the user may continue pressing "Alt-Left" to select other styles contained in the row 312. Since, after each time the user presses an "Alt-Left" key, the modified paragraph is displayed, the user can decide whether he or she likes any of the other styles. If the user continuously presses "Alt-Left," in one embodiment, the processor 110 may apply the last column (column 309) after the first column (column 301). Similarly, in various embodiments, if the user continuously presses "Alt-Right," the processor 110 may apply the first column (column 301) after the last column (column 309), if the user continuously presses "Alt-Down," the processor 110 may apply the first row (row 311) after the last row (row 319), and, if the user continuously presses "Alt-Up," the processor 110 may apply the last row (row 311) after the first row (row 319).

Alternatively, if the user continuously presses "Alt-Up," the processor 110 may stop selecting the styles from a particular column after the style of the first row of that column is applied. Similarly, in various embodiments, if the user continuously presses "Alt-Down," the processor 110 may stop selecting the styles from a particular column after the style of the last row of that column is applied, if the user continuously presses "Alt-Left," the processor 110 may stop selecting the styles from a particular row after the style of the first column of that row is applied, and, if the user continuously presses "Alt-Right," the processor 110 may stop selecting the styles from a particular row after the style of the last column of that row is applied.

In one embodiment, the processor 110 may be further configured for modifying the 2D matrix based on user input. For example, the user may want to modify the 2D matrix to include the most used styles in the cells that require the least number of user actions (e.g., the user presses a shortcut key only once to select the desired style). In such an embodiment, the processor 110 would process a second user input including data indicative of at least one modification to the 2D matrix and, based on the second user input, modify the 2D matrix. Prior to processing the first user input (as described in step 230 above), the processor 110 would store modified 2D matrix in the memory 120 in place of the original 2D matrix generated by the processor 110 in step 210. In this embodiment, in steps 230, 240, and 250 described above, the processor 110 would then use the modified 2D matrix for applying the selected editing style to the selected paragraphs.

Figure 4:
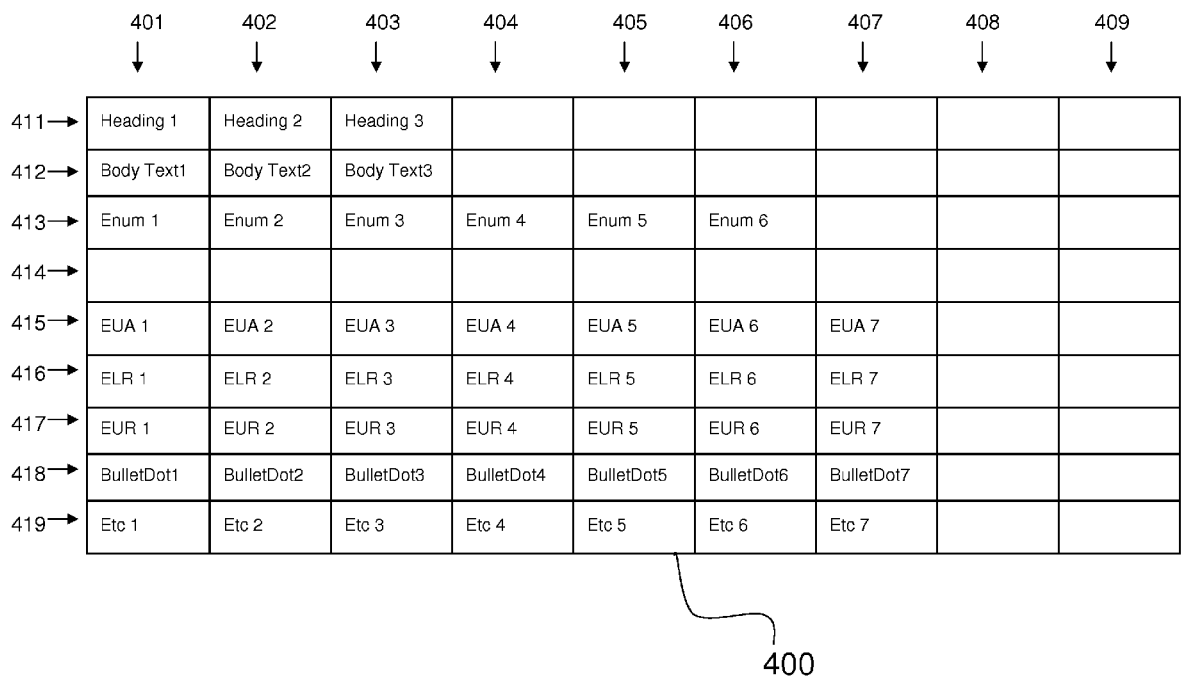
FIG. 4 is a schematic illustration of a modified 2D matrix, according to one embodiment of the present invention.

In such an embodiment, the processor 110 may be further configured to instruct the display 140 to display the 2D matrix after the processor 110 generated the 2D matrix (and prior to processing the second user input). The user may then provide his or her input on how this matrix should be modified. The user modifications to the 2D matrix may include, for example, setting an order of columns and/or rows within the 2D matrix, deleting one or more rows and/or one or more columns, or deleting one or more cells of the 2D matrix. After the modifications, the 2D matrix 300 may, for example, look like a 2D matrix 400 illustrated in FIG. 4. As shown, styles previously included in row 414 and columns 408 and 409 are deleted completely. In addition, styles included in rows 411 and 412, columns 404 through 407, and a style included in row 413, column 407 are also deleted.

Persons skilled in the art will recognize that the 2D matrix 300 originally generated by the processor 110 does not have to be completely filled with styles across all cells, but may also have certain cells not containing any styles, similar to the 2D matrix 400.

Continuing with an example of using an "Alt-arrow" combination for selecting the styles and assuming that the current style applied to a selected paragraph is Body Text 3, if the user presses "Alt-Down," then, according to the 2D matrix 400, the selected style would be Enum 3. If the user then presses "Alt-Down" again, the selected style would be EUA 3. Thus, the processor 110 may be configured to skip the cells of the 2D matrix that do not contain any styles and go to the next cell that does contain a style.

In one embodiment, the user may later add deleted cells, rows, and/or columns back to the 2D matrix.

One advantage of the present invention is that by creating a 2D matrix of available styles, assigning a shortcut key to a procedure for selecting a style (rather than for a particular style, as was done in the prior art), and, immediately after a user selected a style, displaying the part of the document with the selected style applied, the user may quickly go through a large number of styles without having to memorize much information about choosing a particular style.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

Therefore, the scope of the present invention is determined by the claims that follow.

1. A computer system operable to apply a selected editing style to one or more selected portions of a computer-readable document, the system comprising:
    a processor configured for:
        generating a two-dimensional matrix of editing styles available for the document,
        assigning a first shortcut key to a first procedure for selecting an editing style from the two-dimensional matrix, wherein the first procedure comprises:
            determining a current style applied to the one or more selected portions;
            determining a location of the current style within the two-dimensional matrix; and
            selecting a style located a predetermined number of cells away in a predetermined direction from the current style as the editing style,
        processing a first user input including data indicative of the editing style selected using the first shortcut key, and
        based on the first user input, applying the selected editing style to the one or more selected portions to generate one or more modified portions;
    a memory connected to the processor and configured for storing the two-dimensional matrix; and
    a display connected to the processor and configured for displaying the one or more modified portions.

2. The system of claim 1, wherein the processor is further configured for:
    processing a second user input including data indicative of at least one modification to the two-dimensional matrix,
    based on the second user input, modifying the two-dimensional matrix to generate a modified two-dimensional matrix, and
    prior to processing the first user input, storing the modified two-dimensional matrix in the memory as the two-dimensional matrix.

3. The system of claim 2, wherein the processor display is further configured for displaying the two-dimensional matrix on the display prior to the processor processing the second user input.

4. The system of claim 2, wherein the at least one modification comprises setting an order of rows, setting an order of columns, deleting at least one row, and/or deleting at least one column of the two-dimensional matrix.

5. The system of claim 2, wherein the at least one modification comprises deleting one or more cells of the two-dimensional matrix.

6. The system of claim 5, wherein the at least one modification comprises adding at least one of the one or more deleted cells to the two-dimensional matrix.

7. The system of claim 1, wherein the first user input is provided via an interface device connected to the processor.

8. The system of claim 1, wherein the first shortcut key comprises a combination of an "Alt" key and an arrow key.

9. The system of claim 1, wherein the one or more selected portions comprise one or more selected paragraphs.

10. A method for applying a selected editing style to one or more selected portions paragraphs of a computer-readable document, the method comprising:
    generating a two-dimensional matrix of editing styles available for the document;
    assigning a first shortcut key to a first procedure for selecting an editing style from the two-dimensional matrix, wherein the first procedure comprises:
        determining a current style applied to the one or more selected portions;
        determining a location of the current style within the two-dimensional matrix; and
        selecting a style located a predetermined number of cells away in a predetermined direction from the current style as the editing style;
    processing a first user input including data indicative of the editing style selected using the first shortcut key;
    based on the first user input, applying the selected editing style to the one or more selected portions paragraphs to generate one or more modified portions paragraphs; and
    displaying the one or more modified portions paragraphs.

11. The method of claim 10, further comprising:
    processing a second user input including data indicative of at least one modification to the two-dimensional matrix;
    based on the second user input, modifying the two-dimensional matrix to generate a modified two-dimensional matrix; and
    storing the modified two-dimensional matrix as the two-dimensional matrix prior to processing the first user input.

12. The method of claim 11, further comprising displaying the two-dimensional matrix prior to processing the second user input.

13. The method of claim 11, wherein the at least one modification comprises setting an order of rows, setting an order of columns, deleting at least one row, and/or deleting at least one column of the two-dimensional matrix.

14. The method of claim 11, wherein the at least one modification comprises deleting one or more cells of the two-dimensional matrix.

15. The method of claim 14, wherein the at least one modification comprises adding at least one of the one or more deleted cells to the two-dimensional matrix.

16. The method of claim 10, wherein the first shortcut key comprises a combination of an "Alt" key and an arrow key.

17. The method of claim 10, wherein the one or more selected portions comprise one or more selected paragraphs.

18. A computer-readable storage medium containing a set of instructions that, when executed by a processor, performs a method for applying a selected editing style to one or more selected portions of a computer-readable document, including the steps of:
   generating a two-dimensional matrix of editing styles available for the document;
   assigning a first shortcut key to a first procedure for selecting an editing style from the two-dimensional matrix, wherein the first procedure comprises:
      determining a current style applied to the one or more selected portions;
      determining a location of the current style within the two-dimensional matrix; and
      selecting a style located a predetermined number of cells away in a predetermined direction from the current style as the editing style;
   processing a first user input including data indicative of the editing style selected using the first shortcut key;
   based on the first user input, applying the selected editing style to the one or more selected portions to generate one or more modified portions; and
   displaying the one or more modified portions.

19. The computer-readable storage medium of claim 18, wherein the method further includes the steps of:
   processing a second user input including data indicative of at least one modification to the two-dimensional matrix;
   based on the second user input, modifying the two-dimensional matrix to generate a modified two-dimensional matrix; and
   storing the modified two-dimensional matrix as the two-dimensional matrix prior to processing the first user input.

20. The computer-readable storage medium of claim 19, wherein the at least one modification comprises setting an order of rows, setting an order of columns, deleting at least one row, deleting at least one column of the two-dimensional matrix, and/or deleting one or more cells of the two-dimensional matrix.

21. The computer-readable storage medium of claim 18, wherein the one or more selected portions comprise one or more selected paragraphs.

22. The computer-readable storage medium of claim 18, wherein the first shortcut key comprises a combination of an "Alt" key and an arrow key.

* * * * *